United States Patent [19]

Sakurai

[11] 4,159,533
[45] Jun. 26, 1979

[54] ELECTRONIC CASH REGISTER

[75] Inventor: Haruo Sakurai, Shizuoka, Japan

[73] Assignee: Tokyo Electric Co., Ltd., Tokyo, Japan

[21] Appl. No.: 828,315

[22] Filed: Aug. 29, 1977

Related U.S. Application Data

[63] Continuation-in-part of Ser. No. 740,044, Nov. 8, 1976, abandoned.

[30] Foreign Application Priority Data

Nov. 12, 1975 [JP] Japan ................... 50-135944

[51] Int. Cl.² ............................................. G06F 13/00
[52] U.S. Cl. ................................. 364/900; 364/405
[58] Field of Search ............... 364/405, 200 MS File, 364/900 MS File; 235/92 AC, 92 CP, 92 DP, 2, 6, 7 R

[56] References Cited

U.S. PATENT DOCUMENTS

| | | | |
|---|---|---|---|
| 3,631,403 | 12/1971 | Asbo et al. ........................ | 364/900 |
| 4,003,030 | 1/1977 | Takagi et al. ..................... | 364/900 |
| 4,095,738 | 6/1978 | Masuo ............................ | 364/405 X |

*Primary Examiner*—Gareth D. Shaw
*Assistant Examiner*—Thomas M. Heckler
*Attorney, Agent, or Firm*—Flynn & Frishauf

[57] ABSTRACT

An electronic cash register comprises a read only memory, a central processor unit, entry and function keys, memory means including an entry memory storing input data from said entry keys and first and second data memories storing respectively first and second data, a double function key for transferring first data to the first data memory and second data to the second data memory, and printing means for printing input data, price total and further the first and second data. The memory means further comprises a first flag memory storing a "1" when the entry memory stores the first data and a second flag memory storing a "1" when first data is transferred from the entry memory to the first data memory. When the double function key is operated while first data is stored in the entry memory and a "1" is stored only in the first flag memory, the first data is transferred to the first data memory and the second flag memory now stores a "1". The entry and first flag memories are then cleared. Thereafter, when the double function key is operated while second data is stored in the entry memory and a "1" is stored in both the first and second flag memories, second data is transferred to the second data memory. If the transferred second data is incorrect, the entry keys are operated to store new correct second data into the entry memory. Then, the double function key is operated to transfer the new second data to the second data memory. Thereafter, the second flag memory is cleared to permit storing input data in the entry memory which represents a merchandise price.

3 Claims, 5 Drawing Figures

ELECTRONIC CASH REGISTER

CROSS-REFERENCE TO THE RELATED APPLICATION

The present application is a continuation-in-part of my copending application Ser. No. 740,044 filed Nov. 8, 1976, now abandoned.

BACKGROUND OF THE INVENTION

This invention relates to an electronic cash register including printing means for printing on a receipt a plurality of input data each showing a merchandise price and the total of these input data. More particularly it relates to an electronic cash register provided with means for setting in a memory device first and second data to be printed, whose contents need not be varied during a plurality of cash registering operations.

In a department store, for example, a number of electronic cash registers are installed. These cash registers are assigned with register numbers, which are printed on receipt sheets and journal paper together with the sales dates. Unlike the sales dates, such register numbers are semi-permanent and need not be changed daily. Neither the register number nor the sales date needs to be changed during a number of cash registering operations on the same day.

A prior art electronic register wherein the data and the register number are stored in a memory device is provided with, among the function keys, a double function key (called "a data/register number set key") for setting the sales date and the register number. First, the entry keys are operated to store the date. Then, the date/register number set key is operated to set the stored date in a date memory device. Thereafter, the entry keys are operated to store the register number, and then the date/register number set key is operated to set the stored register number in a register number memory device. However, if a wrong register number were set, it would be necessary to repeat the data setting as well as the register number setting. Such a repetition is of course inconvenient in the daily operation of the cash register.

Accordingly, it is an object of this invention to provide an improved electronic cash register wherein a double function key is operated to store first and second input data to be printed the contents of which need not be changed during a plurality of cash registering operations and wherein the second input data can be corrected, when necessary, by storing a new correct second data and setting the same by operating the double function key.

SUMMARY OF THE INVENTION

The electronic cash register according to this invention comprises a read only memory storing a predetermined program, a central processor unit, a plurality of entry keys and function keys, memory means including an entry memory for temporarily storing an input data produced by the entry keys and first and second data memories storing respectively first and second data the contents of which need not be varied during a plurality of cash registering operations, a double function key for transferring the first data from the entry memory to the first data memory and the second data from the entry memory to the second data memory, a totalizer for storing a total of a plurality of input data to be printed on a recording paper, said input data each showing a merchandise price and being temporarily stored in the entry memory, and printing means for printing on the recording paper the input data temporarily stored in the entry memory and the total stored in the totalizer together with the first and second data stored in the first and second data memories. The memory means further comprises a first flag memory which stores a binary bit "1" when the entry memory stores the first data and a second flag memory which stores a binary bit "1" when the first data is transferred from the entry memory to the first data memory. The electronic cash register further comprises first, second and third means. The first means is to transfer the first data from the entry memory to the first data memory when the double function key is operated while the first flag memory stores a binary bit "1" and the second flag memory does not, thereby storing a binary bit "1" into the second flag memory and is to clear the entry memory and the first flag memory upon completion of the transfer of the first data. The second means is to transfer the second data from the entry memory to the second data memory when the double funtion key is operated while both first and second flag memories store a binary bit "1" and is to clear the entry memory and the first flag memory upon completion of the transfer of the second data. The third means is to clear the second flag memory.

To correct a wrong second data stored in the second data memory, it is sufficient to operate the entry keys so as to store a new correct second data into the entry memory and then to operate the double function key so as to store the same into the second data memory, so long as the second flag memory is not cleared. In this case, the first data stored in the first data memory is maintained. Thus, it is much easier to store the first and second data into the first and second data memories in the cash register than in the prior art electronic cash register.

DETAILED DESCRIPTION OF THE PREFERRED EMBODIMENTS

Figure 1:
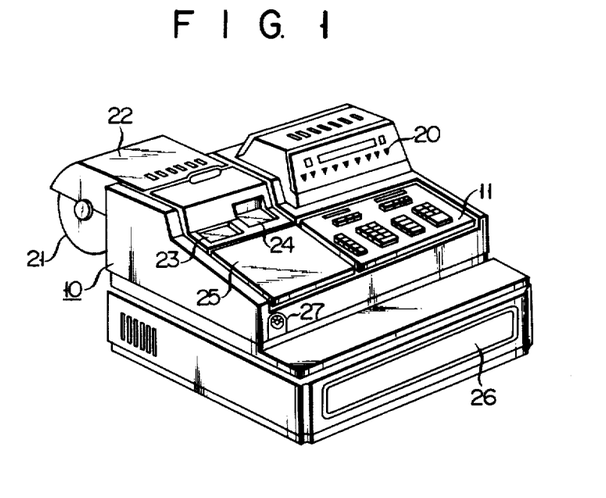
FIG. 1 is a perspective view of an electronic cash register embodying the invention.
Figure 3:
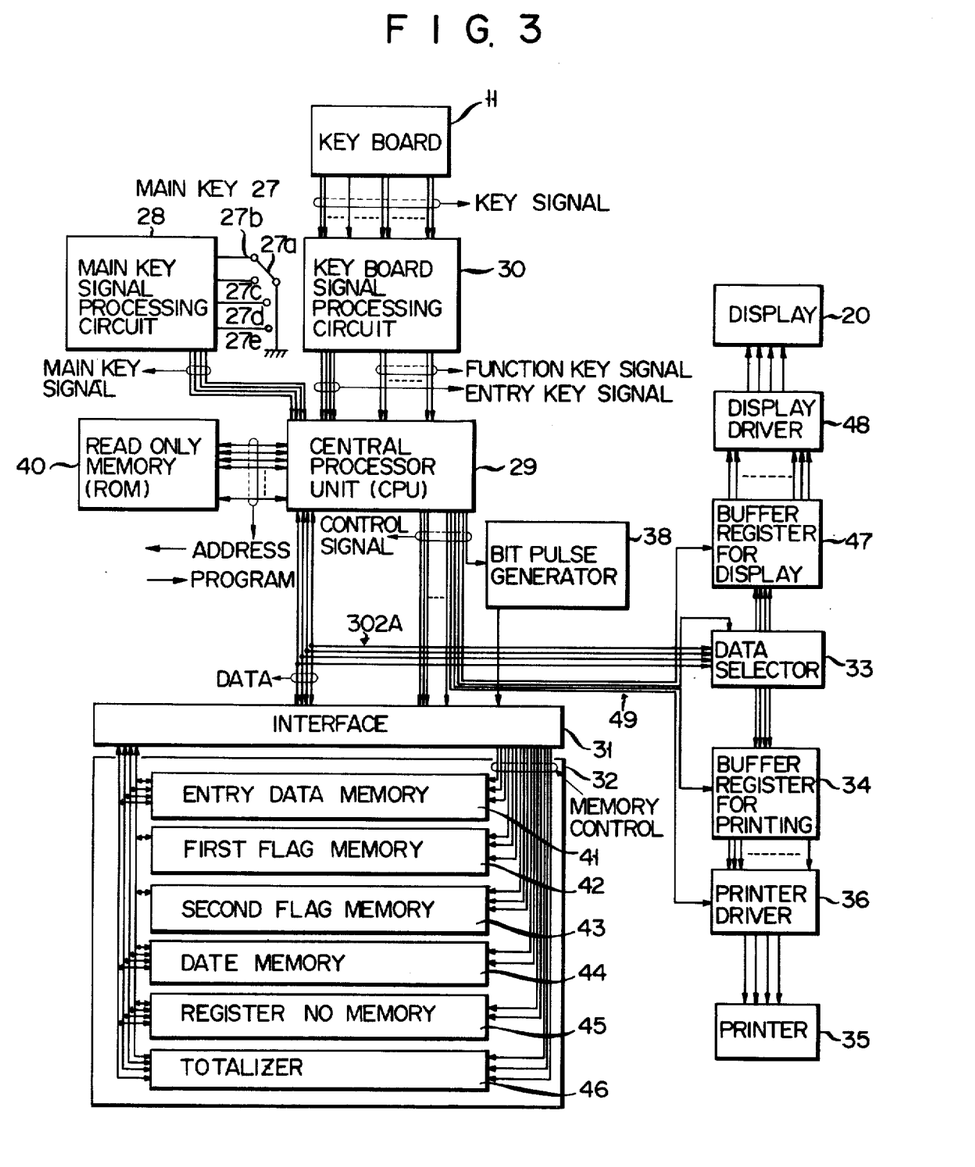
FIG. 3 is a block diagram showing one example of the electric circuit of the cash register shown in FIG. 1.

An electronic cash register shown in FIG. 1 comprises a casing 10 which contains the electric circuit shown in FIG. 3. On the front panel of the casing 10 a keyboard 11 is mounted. The keyboard 11 includes various types of keys. Entry keys 12 are to set the price and number of merchandises sold. Function keys of group 13 serve to carry out, for example, addition, subtraction and multiplication of input data. Clerk keys of group 14 are to set the code, for example, A, B, C or D assigned to the operator of the cash register. Department keys of group 15 are to set the codes, for example, -1, 2, 3, 4, ... assigned to the departments of merchandises sold. A receipt feed key (RF) 16 is to feed a receipt sheet without any interlocking with the printing of the input data. A journal paper feed key (JF) 17 is to feed a journal paper without any interlocking with the printing of the input data. And a date/register number set key (D/NO) 18 is operated to set the sales data and the register number into a memory device.

Figure 2:
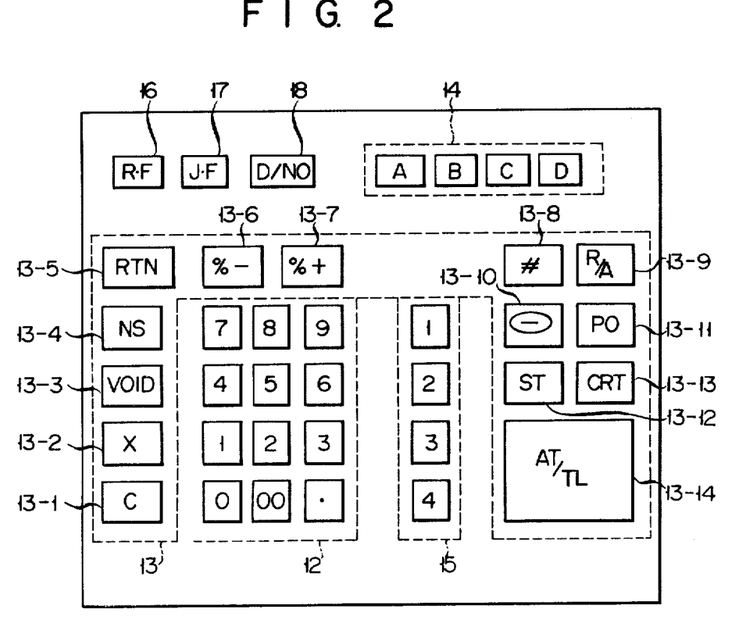
FIG. 2 is a plan view showing the detail of the keyboard of the cash register shown in FIG. 1.

The key group 12 includes entry keys for ".", "00" and "0" to "9", for example. The function key group 13 contains, for example, a clear key (C) 13-1, a multiplication key (X) 13-2, a void key (VOID) 13-3, a no-sale key (NS) 13-4, a return merchandise key (RTN) 13-5, percent keys (%−) 13-6 and (%+) 13-7, a number key (#) 13-8, a received-on-account key (R/A) 13-9, a subtract key ( ⊖ ) 13-10, a paid-out key (PO) 13-11, a sub-total key (ST) 13-12, a credit sales total key (CRT) 13-13 and a double function key (AT/TL) 13-14 functioning as both an amount tendered key (AT) and a cash total key (TL).

Further, the casing 10 is provided with a display section 20 for displaying sub-total (ST), total (TL), register number, void, etc., a roll mounting section 22 for mounting a roll 21 of journal paper and receipt sheet, a receipt issue windown 23, a window 24 for inspecting the data printed on the journal paper, a memo paper holder 25 for holding a memo paper or the like by a permanent magnet (not shown), a drawer 26 for accommodating and taking out cash, and a main key switch 27. The main key switch 27 is operated with a key by the operator of the cash register or a supervisor. When operated, the main key switch 27 supplies to a central processing unit (CPU) 29 (to be described later) a command signal which causes the CPU 29 to perform an operation such as "register", "inspection" and "clear". The term "register" is employed herein to mean a series of operations, e.g. storing the input data showing merchandise prices into a memory device of each cash register, totalizing these input datas, and printing the input data and the total thereof on a receipt sheet and the journal paper. The term "inspection" means the operations of checking the total sales amount and the total number of the merchandises sold, both stored in the memory device, by printing the total sales amount and the total number of merchandise on the journal paper. The term "clear" means an operation of clearing the contents of the memory device after the total sales amount and the total number of merchandise items sold for the day, for example, have been read out from the memory device and printed on the journal paper.

As shown in FIG. 3, the main key switch 27 has a movable contact 27a and four stationary contacts 27b to 27e. The contact 27a is thrown to any one of the stationary contacts. When the contact 27b is closed, the operation is "OFF". When the contact 27c is closed, the operation is "register". When the contact 27d is closed, the operation is "inspection", and when the contact 27e is closed, the operation is "clear". Suppose the contact 27c, i.e. "register" terminal, is closed. Then, a circuit 28 judges and processes a signal from the main key switch 27 and supplies to the central processing unit (CPU) 29 a command which causes the CPU 29 to perform a "register" operation.

A key signal produced by key operation on the keyboard 11 is supplied to a key signal processing circuit 30. The processed key signal from the circuit 30 is fed to the CPU 29. The output of the CPU 29 is supplied through an interface 31 to a memory means 32. The data stored in the memory means 32 and destined to be printed on the receipt sheet and the journal paper are supplied to a data selector 33 through the interface 31. The output data of the data selector 33 are stored into a print buffer register 34. The data from the print buffer register 34 are printed on a printing paper (not shown) by a printer 35 under control of a printer driver 36. The printer driver 36 is controlled by the CPU 29.

There is provided a bit pulse generator 38 which produces timing signal under control of the CPU 29. These timing signals are supplied to five memories 41 to 45 and a totalizer 46 which constitutes the memory device 32. Further provided is a read only memory 40 coupled to the CPU 29 and storing a fixed program.

The memory means 32 includes an entry data memory 41 for temporarily storing an input data produced by operation of the entry keys 12, a first flag memory 42 for the entry keys 12, a second flag memory 43 for the D/NO set key 18, a date memory 44, a register number memory 45 and a totalizer 46. The totalizer 46 may be so constructed as to totalize the input data according to the types of merchandise, customers, register operators or supervisors. It may be constituted by a memory using complementary metal oxide semiconductors (CMOS's). Similarly, the memories 41 to 45 may be constituted also by CMOS's. Each of these memories may be provided with means to prevent erasion of the memory contents at interruption of power supply, e.g. a transfer switch which connects the memory to a battery upon interruption of power supply. Or each memory may be constituted by a non-volatile memory. The first flag memory 42 and the second flag memory 43 may be constructed as units independent of the other memories.

The invention is characterized by the first flag memory 42 and the second flag memory 43. It is further characterized in that the memory states of these flag memories 42 and 43 are interlocked with the operation of the entry keys 12 and the D/NO set key 18, thereby enabling to readily set the sales date and the register number in the date memory 44 and the register number memory 45, respectively. Further, in case a wrong register number is set in the register number memory 45, it can be replaced by a correct register number merely by operating the entry keys 12 to store the correct register number and by operating the D/NO set key 18 only. The date need not be set newly.

The first flag memory 42 is constituted by, for example, a register and stores a binary bit "1" when an input data is stored into the entry data memory 41. In other words, the first flag memory 42 stores a binary bit "1" when the date to be set in the date memory 44 is stored into the entry data memory 41. The second flag memory 43 for the D/NO set key 18 is so designed as to store a binary bit "1" when the date stored in the entry data memory 41 is stored into the date memory 44. The relationship among the operations of the flag memories 42 and 43 and the respective keys and the setting of the date and register number will be described in detail with reference to FIG. 4.

Figure 4:
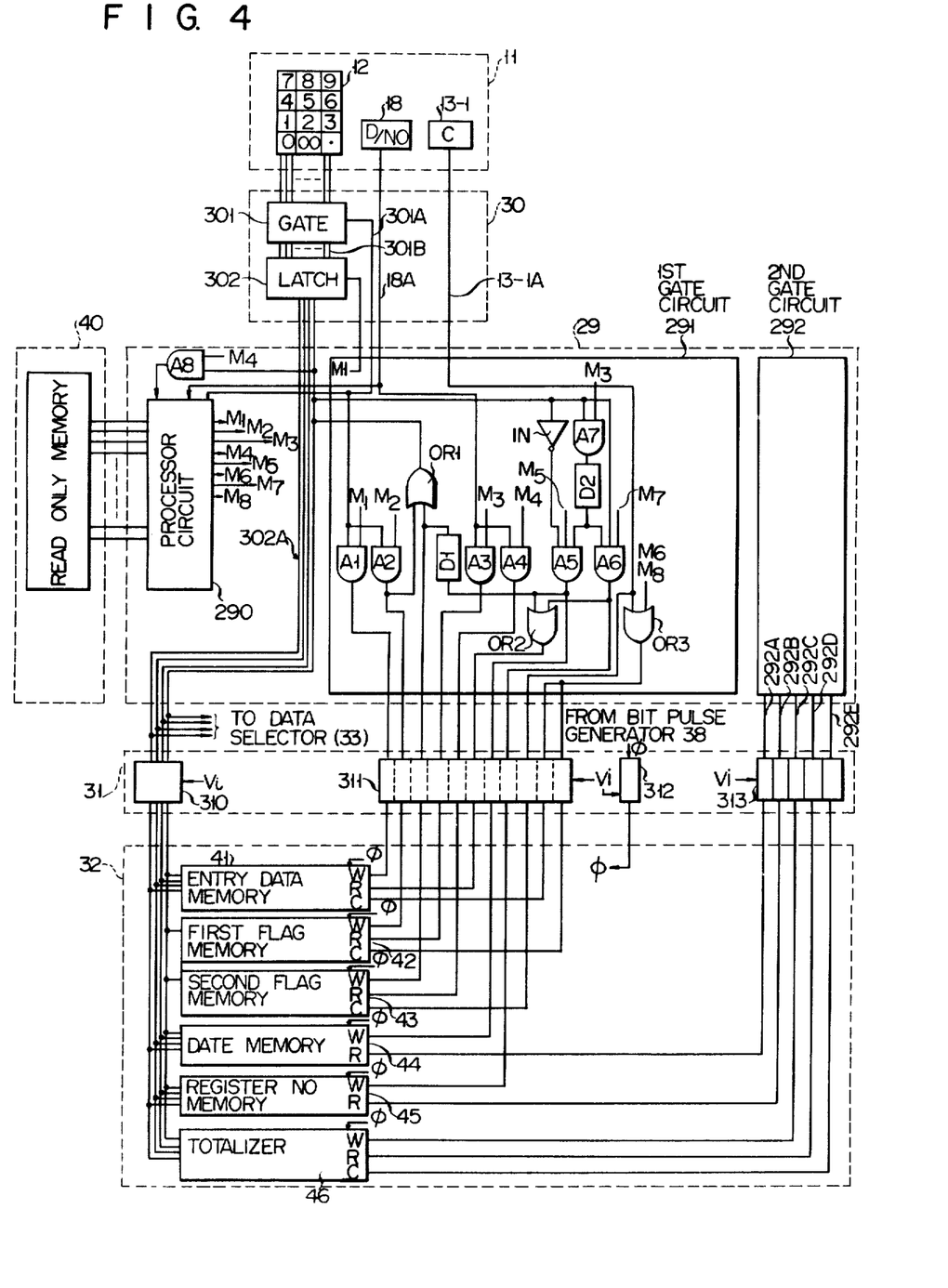
FIG. 4 shows in detail the important parts of the electric circuit shown in FIG. 3.

FIG. 4 shows only the essential parts of the electronic cash register illustrated in FIG. 3. Of the constituents of the keyboard 11, only the entry keys 12, the D/NO set key 18 and the clear key 13-1 are shown in FIG. 4. The key signal processing circuit 30 is illustrated as if comprised of only a gate circuit 301 and a latch circuit 302. The gate circuit 301 generates, when any one of the entry keys 12 is depressed, a key operation signal 301A and a key signal 301B showing the digital value assigned to the depressed entry key. The latch circuit 302 latches the key signal 301B and releases the same upon receipt of a timing signal M1 (to be described later). Upon releasing the key signal 301B, the latch circuit 302 converts the key signal 301B into a code signal 302A, e.g. "1-2-4-8".

In FIG. 4 the central processing unit (CPU) 29 is shown as if including a processor circuit 290, a first gate circuit 291 and a second gate circuit 292. The processor circuit 290 reads out the contents of the read only memory 40 upon receipt of a key operation signal 301A from the gate circuit 301 and then generates timing signals M1 and M2. The first gate circuit 291 includes AND gates A1 to A7, OR gates OR1 to OR3, an inverter IN and delay circuits D1 and D2. Another AND gate A8 is connected to the processor circuit 290 and receives a timing signal M4 from the processor circuit 290 and one of the digit codes which constitute the code signal 302A. The output of the AND gate A8 is supplied to the processor circuit 290. The processor circuit 290 is supplied with an output signal 18A of the D/NO set key 18. When the clear key 13-1 is depressed, it generates a signal 13-1A, which is supplied also to the OR circuit OR3.

The second gate circuit 292 of the CPU 29 serves to control the printing of data. It is supplied with key operation signals other than the output signal 18A of the D/NO set key 18. Further the second gate circuit 292 is supplied with timing signals which another processor circuit (not shown) coupled to the read only memory 40 has generated according to the key operation signals other than the output signal 18A. When supplied with these key operation signals and timing signals, the second gate circuit 292 produces a specific output.

The code signal 302A is supplied to the data selector 33 shown in FIG. 3. Then, the data corresponding to the code signal 302A is displayed at the display section 20 shown in FIG. 1 or printed by the printer 35 shown in FIG. 3.

The interface 31 is illustrated in FIG. 4 as if including four level converters 310 to 313 each supplied with a level control signal Vi. The first level converter 310 is to convert the level of the code signal 302A. The second level converter 311 is to convert the level of the output of the first gate circuit 291. The third level converter 312 is to convert the level of a timing pulse $\phi$ from the bit pulse generator 38, and the fourth level converter 313 to convert the level of the output of the second gate circuit 292.

The entry data memory 41, date memory 44, register number memory 45 and totalizer 46 of the memory means 32 are supplied each with the code signal 302A from the level converter 310. But the first flag memory 42 and the second flag memory 43 are supplied with any one of the digit codes constituting the code signal 302A from the first level converter 310. Further, the entry data memory 41, first flag memory 42, second flag memory 43 and totalizer 46 are each provided with a write terminal W, read terminal R and a clear terminal C. The data memory 44 and register number memory 45 are each provided with a write terminal W and a read terminal R. The terminals W, R and C of the entry data memory 41 are coupled to the output of the AND circuit A1, the output of the OR circuit OR2 and the output of the OR circuit OR3, respectively. The terminals W, R and C of the first flag memory 42 are coupled to the output of AND circuit A2, the output of the AND circuit A3 and the output of the OR circuit OR3, respectively. The terminals W, R and C of the second flag memory 43 are coupled to the output of the delay circuit D1, the output of the AND circuit A4 and the clear signal 13-1A, respectively. The terminals W and R of the date memory 44 are coupled to the output of the AND circuit A5 and the output 292A of the second gate circuit 292, respectively. The terminals W and R of the register number memory 45 are coupled to the output of the AND circuit A6 and the output 292B of the second gate circuit 292, respectively. The terminals W, R and C of the totalizer 46 are coupled to the outputs 292C, 292D and 292E of the second gate circuit 292, respectively.

With reference to FIG. 4, it will now be explained in detail how to store, for example, the sales date (first data) and the register number (second data) into the date memory 44 and the register number memory 45, respectively, how to store the correct register number into the register number memory 45 in case a wrong register number is stored in the memory 45, and how to clear the binary bit "1" in the second flag memory 43 in case both the sales date in the date memory 44 and the register number in the register number memory are correct.

The sales date is stored into the entry data memory 41 in the following manner. If the sales date is, for example, "3.15" which means "March 15", the entry key "3" is depressed. Then the gate circuit 301 generates a key operation signal 301A which indicates that the entry key "3" has been depressed. The key operation signal 301A is supplied to both the processor circuit 290 and the AND circuit A1. When the signal 301A is supplied to the processor circuit 290, the processor circuit 290 reads out a specific program from the read only memory (ROM) 40. Upon receipt of the program, the processor circuit 290 generates a timing signal M1. In the meantime, a key signal 301B showing the digital value of the depressed entry key "3" is latched by the latch circuit 302. In response to the timing signal M1, the latch circuit 302 converts the key signal 301B into a code signal 302A "1-2-4-8". The code signal 302A is then supplied to the entry data memory 41 through the first level converter 310 of the interface 31.

The output of the AND circuit A1, which is supplied with the key operation signal 301A and the timing signal M1, is supplied through the second level converter 311 to the write terminal W of the entry data memory 41. As a result, "3" is stored into the entry data memory 41. This done, the processor circuit 290 generates a timing signal M2, which is supplied to the AND gate A2. The AND gate A2 is already supplied with the key operation signal 301A. The output of the AND gate A2 is therefore supplied to the input of the first flag memory 42 through the OR gate OR1 and the first level converter 310. Simultaneously the output of the AND gate A2 is supplied also to the write terminal W of the first flag memory 42 through the level converter 311. Consequently, the output of the AND gate A2, which has been supplied through the OR gate OR1 and the first level converter 310, is written into the first flag memory 42 as a binary bit "1". Thereafter the entry keys ".", "1" and "5" are depressed one after another, thereby writing the sales date "3.15" into the entry data memory 41. Thus, while the sales date "3.15" is stored in the entry data memory 41, a binary bit "1" is stored in the first flag memory 42 and a binary bit "0" in the second flag memory 43.

To transfer the contents of the entry data memory 41 to the date memory 44, the D/NO set key 18 (i.e. double function key) is depressed. Upon depression of the D/NO set key 18 a signal 18A is applied to the processor circuit 290 and the AND gates A3 and A4. Then the processor circuit 290 generates a timing signal M3, which actuates the AND gate A3. Actuated by the timing signal M3, the AND gate A3 supplies the signal 18A as a read signal to the read terminal R of the first flag memory 42 through the second level converter 311. The binary bit "1" is therefore read out from the first flag memory 42. It is supplied to the delay circuit D2 through the AND gate A7 when the timing signal M3 is fed to the AND gate A7. Further, it is delayed until the processor circuit 290 generates a timing signal M5.

A timing signal M4 is generated by the processor circuit 290 after the timing signal M3. Simultaneously the output signal 18A of the D/NO set key 18 is supplied through the AND gate A4 to the read terminal R of the second flag memory 43. Then, the contents of the second flag memory 43, i.e. binary bit "0", is read out. The binary bit "0" is applied to the inverter IN through the first level converter 310. Thus, the binary bit "0" is converted by the inverter IN into a "1" signal. The "1" signal thus obtained is supplied to the AND gate A5. Then, the processor circuit 290 generates a timing signal M5. Upon receipt of the timing signal M5 the AND gate A5 delivers an output signal "1". The output "1" of the AND gate A5 is supplied through the second level converter 311 to the write terminal W of the date memory 44 and also to the read terminal R of the entry data memory 41 through the OR gate OR2 and the second level converter 311. As a result, the contents "3.15" of the entry data memory 41 is transferred to the date memory 44.

In the meantime, a write signal "1" is supplied from the AND gate A5 to the write terminal W of the second flag memory 43 through the delay circuit D1 and the second level converter 311. At the same time a binary bit "1" is fed to the input of the second flag memory 43 from the AND gate A5 through the delay circuit D1, the OR gate OR1 and the first level converter 310. As a result, the binary bit "1" is written into the second flag memory 43. This done, the processor circuit 290 generates a timing signal M6, which is supplied to the clear terminals C of the entry data memory 41 and the first flag memory 42 through the OR gate OR3 and the second level converter 311. Consequently, both the entry data memory 41 and the first flag memory 42 are cleared.

As mentioned above, the sales date, for example "3.15", is transferred from the entry data memory 41 to the date memory 44 by depressing the D/NO set key 18 (i.e. double function key) in case the first flag memory 42 stores a binary bit "1" and the second flag memory 43 does not. Once this data transfer has been completed, both the entry data memory 41 and the first flag memory 42 are cleared so that the register number, can be stored into the register number memory 45.

Now it will be explained how to store the register number, for example "25" into the register number memory 45. The register number is stored into the entry data memory 41 in the same manner as the sales data, except that the different entry keys 12 are depressed. For this reason it is not described here how to store the register number into the entry data memory 41.

Once the register number has been stored into the entry data memory 41, a binary bit "1" is stored into the first flag memory 42. Now that the sales date "3.15" has been transferred from the entry data memory 41 to the date memory 44, a binary bit "1" is stored in the second flag memory 43. Thus, both flag memories 42 and 43 store a binary bit "1" when the register number "25" is stored in the entry data memory 41. Under this condition the D/NO set key 18 (i.e. double function key) is depressed to transfer the register number "25" to the register number memory 45.

Upon depression of the D/NO set key 18, a signal 18A is supplied to the processor circuit 290 and the AND gates A3 and A4. Then the processor circuit 290 generates timing signals M3 and M4, which are fed to the AND gates A3 and A4, respectively. As a result, the signal 18A is supplied as a read signal to the read terminals R of both flag memories 42 and 43. The binary "1" is therefore read out from the first flag memory 42 and is applied to the AND gate A7 through the first level converter 310. The binary bit "1" from the first flag memory 42 passes through the AND gate A7 when the timing signal M3 is fed to the AND gate A7. It is delayed at the delay circuit D2 until a timing signal M7 is fed to the AND gate A6. Thus it is supplied to the AND gate A6 together with the timing signal M7. In the meantime, the binary bit "1" read out from the second flag memory 43 is supplied to the inverter IN through the first level converter 310 and is converted into a "0" signal. This "0" signal is fed to the AND gate A5. The output of the AND gate A5 is therefore a "0" signal. Thus, the register number "25" is not written into the date memory 44.

A timing signal M7 is generated by the processor circuit 290 after the timing signal M4. The timing signal M7 is fed to the AND gate A6 together with the delayed binary bit "1" from the delay circuit D2 and the binary bit "1" read out from the second flag memory 43. Then the AND gate A6 produces an output "1", which is supplied to the write terminal W of the register number memory 45. At the same time the output "1" of the AND gate A6 is supplied to the read terminal R of the entry data memory 41 through the OR gate OR2 and the second level converter 311. Consequently, the register number "25" is transferred from the entry data memory 41 to the register number memory 45.

In this way, the register number stored in the entry data memory 41 can be transferred to the register number memory 45, provided that both the first and second flag memories 42 and 43 store a binary bit "1". After the timing signal M7 a timing signal M8 is generated by the processor circuit 290 and supplied to the clear terminals C of the entry data memory 41 and the first flag memory 42 through the OR gate OR3 and the second level converter 311. The register number "25" in the entry data memory 41 and the binary bit "1" in the first flag memory 42 are therefore erased once the register number "25" has been transferred to the register number memory 45.

In case a wrong register number is mistakenly stored into the register number memory 45, it should be replaced by the correct register number. The correct register number is stored into the register number memory 45 in the following procedure. Before clearing the second flag memory 43, the entry keys 12 are so depressed as to store the correct register number into the entry data memory 41. Thus, a binary bit "1" is written into the first flag memory 42. At this time a binary bit "1" is stored in the second flag memory 43, too, since the sales date "3.15" has been already transferred from the entry data memory 41 to the date memory 44. Namely, both flag memories 42 and 43 store each a binary bit "1". Under this condition the D/NO set key 18 is depressed, whereby the correct register number is transferred from the entry data memory 41 to the register number memory 45 and expells the wrong register number from the register number memory 45. After the correct register number has been stored into the register number memory 45, both the entry data memory 41 and the first flag memory 42 are cleared by a timing signal M8.

Once the entry data memory 41 and the first flag memory 42 have been cleared, the clear key 13-1 is depressed to generate a clear signal 13-1A. The clear signal 13-1A is supplied through the second level converter 311 to the clear terminal C of the second flag memory 43. In this way the binary bit "1" in the second flat memory 43 is erased.

Now that the sales data and the register number have been stored in the date memory 44 and the register number memory 45, respectively with the second flag memory 43 now emptied, the entry keys 12 may be operated to store, for example, the price of each merchandise sold into the entry data memory 41. Every time the price of a merchandise sold is stored into the entry data memory 41, the price is printed on a receipt paper. At the same time, the price of the merchandise is transferred from the entry data memory 41 to the totalizer 46 and added to the sum of the prices of the other merchandises sold. Once the prices of all the merchandises sold to a customer have been printed on the receipt paper, the total sales amount is printed on the receipt paper together with the sales date and register number.

Since these data printing techniques are well known and this invention aims to improve means for storing data into memories, it will be described only briefly how to print the data with reference to FIG. 2, FIG. 3 and FIG. 4.

When the price of each merchandise sold is stored into the entry data memory 41 by operating the entry keys 12, a key operation signal (not shown) is supplied to a processor circuit (not shown). This processor circuit generates timing signals (not shown) under control of the program stored in the ROM 40. These timing signals control the second gate circuit 292, which produces outputs 292A to 292E. The outputs 292A to 292E of the second gate circuit 292 are to be supplied through the fourth level converter 313 to the read terminal R of the date memory 44, the read terminal R of the register number memory 45, the write terminal W of the totalizer 46, the read terminal R of the totalizer 46 and the clear terminal C of the totalizer 46, respectively. The input data from the keyboard 11, which shows the price of the merchandise sold, is fed as a code signal 302A to the data selector 33 through the gate circuit 301 and the latch circuit 302. The code signal 302A is supplied from the data selector 33 to a display buffer register 47 and then to a display driver 48. Finally the code signal 302A is decoded and displayed by the display section 20 in the form of digits, e.g. "1", "2", "3" and so forth. The data selector 33, the buffer registers 34 and 47 and the printer driver 36 are controlled by a control signal 49 from the CPU 29. When the outputs 292A and 292B of the second gate circuit 292 are supplied to the read terminal R of the date memory 44 and the read terminal R of the register number memory 45, respectively, the sales date and the register number are supplied to the data selector 33 through the first level converter 310 and are eventually printed on the same receipt paper. In response to the output 292C of the second gate circuit 292, the totalizer 46 adds the price of one merchandise stored in the entry data memory 41 to those of the other merchandises sold. When the output 292D of the second gate circuit 292 is supplied to its read terminal R, the totalizer 46 feeds the total sales amount to the data selector 33 through the first level converter 310. The total sales amount from the data selector 33 is then printed on the receipt paper. Thereafter, the contents of the totalizer is cleared by the output 292E of the second gate circuit 292.

To perform the "inspection", the contact 27d of the main key switch 27 is closed and then the AT/TL key 13-14 is operated. Then, the data which have been stored in the totalizer 46 since the previous clear operation are read out. The date and the register number are also read out from the date memory 44 and the register number memory 45. The data from the totalizer 46, the sales date and the register number are therefore printed on the journal paper. During the "inspection" the contents of the totalizer 46 are preserved, though they are read out.

To perform the "clear" operation, the stationary contact 27e of the main key switch 27 is closed and then the AT/TL key 13-14 is operated. Then, the data which have been stored in the totalizer 46 since the previous "clear" operation are read out, and the sales date and the register number are read out from the date memory 44 and the register number memory 45, respectively. As in the "inspection" operation, the data from the totalizer 46 and the date and the register number are printed on the journal paper. But in this case, the contents of the totalizer 46 and all the memories 41, 42, 43, 44 and 45 are cleared after the printing operation.

If there are first and second data which need not be changed during a number of cash registering operations, they may be stored in the date memory 44 and the register number memory 45, respectively, in place of the sales date and the register number.

Figure 5:
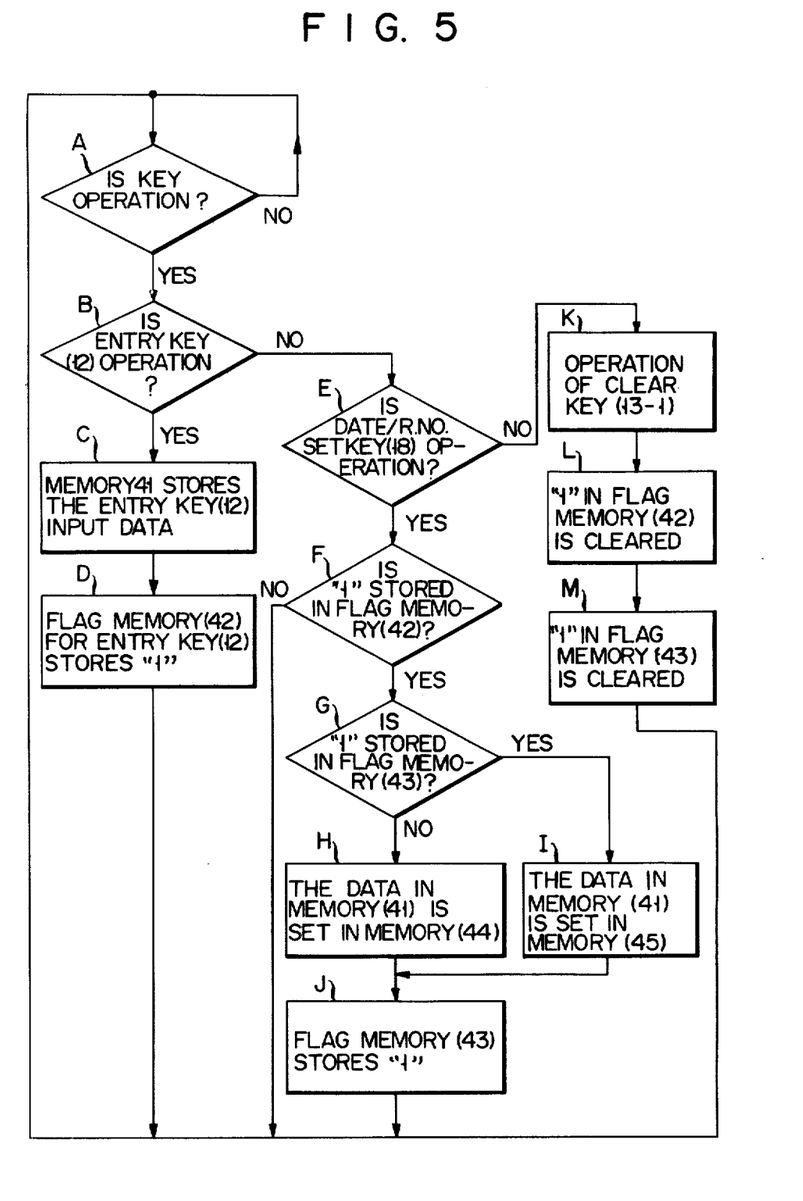
FIG. 5 is a flow chart showing the sequence of the control performed by the electric circuit shown in FIG. 3.

With reference to the flow chart in FIG. 5 it will now be described how and in what sequence the necessary data are stored or set in the memories 41, 44 and 45 and how a binary bit "1" is stored in the flag memories 42 and 43 in accordance with the operations of the entry keys 12 and the D/NO key 18.

First it is judged if any key operation is required (step A). Then, when the key operation is found to be necessary, it is judged whether the entry keys should be operated or not (step B). When the entry keys 12 are depressed the input data is stored into the entry data memory 41 (step C). Upon completion of step C, the first flag memory 42 stores a binary bit "1" (step D). When the D/NO set key 18 is depressed (step E), it is judged whether or not the first flag memory 42 stores a binary bit "1" (step F). If the first flag memory 42 stores a binary bit "1", it is judged whether or not the second flag memory 43 stores a binary bit "1" (step G). If no binary bit "1" is found in the second flag memory 43, the input data (i.e. sales date) is transferred from the entry data memory 41 to the data memory 44 (step H) and then the second flag memory 43 stores a binary bit "1" (step J). If a binary bit "1" is found in the second flag memory 43, the input data (i.e. register number) is transferred from the entry data memory 41 to the register number memory 45 (step I).

If the operation of the D/NO set key 18 is not requested at step E, the data stored in the date memory 44 and the register number memory 45 should be cleared. In this case, the clear key 13-1 or no sale key 13-4 is depressed (step K). Then the binary bit "1" in the first flag memory 42 is cleared (step L), and the binary bit "1" in the second flag memory 43 is cleared (step M).

What is claimed is:

1. In an electronic cash register of the type comprising a read only storing a predetermined program; a central processor unit; a plurality of entry keys for entering merchandise price data which is to be printed on a recording paper, and for entering first data and second data which are to be printed on the recording paper, said first data and second data not being varied during a plurality of cash registering operations; a plurality of function keys; a memory means coupled to said entry keys and including an entry memory for temporarily storing said merchandise price data and said first and second data, a first data memory for storing said first data and a second data memory for storing said second data; a double function key coupled to said memory means for generating a signal to transfer said first data from said entry memory to said first data memory and to transfer said second data from said entry memory to said second memory; a totalizer for accumulating a plurality of merchandise price data entered by said entry keys; and printing means for printing on the recording paper said merchandise price data temporarily stored in said entry memory, the total accumulated in said totalizer, the first data stored in said first data memory and the second data stored in said second data memory;

the improvement wherein:

said memory means further comprises a first flag memory for storing a binary bit "1" when said entry memory stores the merchandise price data, the first data and the second data; and a second flag memory for storing a binary bit "1" when the first data is transferred from said entry memory to said first data memory; and the cash register further comprises:

first means for transferring the first data from said entry memory to said first data memory when said double function key is operated to store a binary bit "1" into said second flag memory and for clearing said entry memory and said first flag memory upon completion of the transfer of said first data, said double function key being operated while said first and second flag memories store a binary bit "1" and a binary bit "0", respectively;

second means for transferring the second data from said entry memory to said second data memory when said double function key is operated and for clearing said entry memory and said first flag memory upon completion of the transfer of the second data, said double function key being operated while both said first and second flag memories store a binary bit "1"; and third means coupled to said second flag memory for clearing the contents of said second flag memory.

2. An electronic cash register according to claim 1, wherein said first data is date data and said second data is a register number data.

3. An electronic cash register according to claim 1, wherein said first data is a register number data and said second data is date data.

* * * * *